United States Patent
O'Brien et al.

[11] 3,857,957
[45] Dec. 31, 1974

[54] PERFLUORO-TERTIARY-ALKANOL COMPOUNDS AS FUMIGANTS

[75] Inventors: John Butler O'Brien, Morris Plains; Cyril Woolf, Morristown, both of N.J.; Robert Ernest Arthur Dear, Mount Kisco, N.Y.

[73] Assignee: Allied Chemical Corporation, New York, N.Y.

[22] Filed: Jan. 13, 1972

[21] Appl. No.: 217,634

[52] U.S. Cl. .................................. 424/343, 260/633
[51] Int. Cl. .............................................. A01n 9/24
[58] Field of Search ..................... 260/633; 424/343

[56] References Cited
UNITED STATES PATENTS

| | | | |
|---|---|---|---|
| 3,317,615 | 5/1967 | Graham | 260/633 |
| 3,560,626 | 2/1971 | Dear et al. | 424/343 |
| 3,592,924 | 7/1971 | Pierce | 424/343 |
| 3,616,360 | 10/1971 | Dear et al. | 424/343 |

Primary Examiner—Vincent D. Turner
Attorney, Agent, or Firm—Fred L. Kelly

[57] ABSTRACT

Perfluoro-tertiary-alkanols of the formula

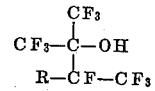

wherein R is either fluorine or trifluoromethyl are outstanding fumigants against common penetrating pests such as those infecting soil, plants, grain, flour and carpets.

3 Claims, No Drawings

PERFLUORO-TERTIARY-ALKANOL COMPOUNDS AS FUMIGANTS

BACKGROUND OF THE INVENTION

This invention relates to perfluoro-tertiary-alkanols as fumigants and, more particularly, to a process for the control of pest organisms by subjecting the pests to the vapor of a perfluoro-tertiary-alkanol having the structure

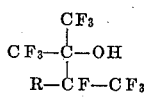

wherein R is either fluorine or trifluoromethyl.

As is known in the art, the control of pest organisms which infest hosts such as soil, grain, fruits, vegetables, textiles, dwellings, warehouses and the like is extremely difficult in those cases where the pest organisms penetrate deeply into the interior of the host space. The use of surface poisons or pesticides for this purpose is not completely effective because of the difficulty in reaching the interior of the space. Although various fumigants have been proposed for controlling such pests, there is need for new and highly effective fumigants.

SUMMARY OF THE INVENTION

We have now discovered that perfluoro-tertiary-alkanols of the structure

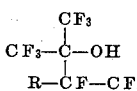

wherein R is either fluorine or trifluoromethyl are outstanding fumigants for the control of penetrating pest organisms infesting hosts such as soil, grain, plants, flour, carpets, etc. In the process of the invention, the pests are subjected to an atmosphere comprising a lethal concentration of the perfluoro-tertiary-alkanol fumigant. This involves contacting the pests with the vapor of said fumigant in the enclosed space in which the pests exist. (For purposes of this invention, the interstices normally present in soil are considered as enclosed space).

The perfluoro-tertiary alkanols of use in the process of the invention are generally known as perfluoro-1,1,2-trimethyl-1-propanol and perfluoro-1,1-dimethyl-1-propanol. They may be synthesized by means taught in the art, for example, in accordance with the method of U.S. Pat. No. 3,317,615.

The process of this invention is particularly applicable for combating termites and nematodes in soil, pest infestation in flour, grain and other products contained in storage bins or grain elevators and the like, and in combating plant pests. The process is also effective for control of other pests such as mites, flies, roaches, etc.

The pests are subjected to a toxic concentration of the perfluoro-tertiary-alkanol of the invention according to well established methods known to the art. According to a typical method, the toxicant is introduced into the enclosed space in which the pests exist in such a manner that it is free to volatilize and permeate the atmosphere in the enclosed space.

A dosage of 0.05 to 5, preferably 0.1 to 2, pounds of the toxicant per thousand cubic feet of enclosed space is sufficient to saturate the area and to insure effective control of the pests. The exposure time required depends upon the size of the enclosed area, the concentration of the toxicant, and the type of host, e.g., flour or grain, in the enclosed space. The time generally required for most effective fumigation is from about 4 to about 24 hours. In larger areas, such as grain elevators, desirable fumigation times may be about 24 to 36 hours or even longer.

The fumigation may be carried out, for example, by spraying or by placing the toxicant in an open container or shallow tray in close contact with the atmosphere surrounding the pest organisms under conditions which allow for vaporization of the toxicant.

Preferably, the toxicant can be supplied in the form of a fumigant composition employing solutions or emulsions of the toxicant in organic solvents and/or water. Carbon tetrachloride, carbon disulfide, chloroform, acetone and deodorized oils such as kerosene may be used as solvents. Although compositions containing less than 0.1 percent by weight of active ingredient may be used, it is desirable to use compositions containing at least about 0.1 percent of active ingredient because otherwise the amount of carrier becomes excessively large. Activity increases with the concentration of active ingredient, which may be 10, 50, 95 percent or even higher. The instant compounds may constitute the sole active ingredient in the fumigant composition, but they may be effectively used with other active ingredients.

Further, fogging may be employed if rapid dispersion of the toxicant into the atmosphere is desired. For example, deodorized kerosene containing the desired quantity of toxicant may be fogged into a warehouse from one or more points. Volatilization of the toxicant occurs in the air permitting a rapid build up of vapor which is dispersed relatively evenly throughout the free space in the warehouse.

In treating grain or flour, the toxicant may be sprayed over the grain or flour where it is contained in the enclosure, such as storage warehouses, bins, elevators and the like, and allowed to vaporize and to remain in the enclosed space until it has volatilized or permeated the space.

As a soil nematocide, the instant compounds may be applied in a suitable solvent carrier as a spray to the furrows with the planting of the seeds. For example, the toxicant may be applied to the seed rows as an acetone solution at the rate of 0.1 to 10 pounds per acre applied to the seed rows the equivalent to an area 2 inches wide and 2 inches deep to parallel rows in one direction a distance of about 20 to 40 inches apart. Also, for example, the fumigant composition may be applied to the soil broadcast as an aqueous spray with an application rate of 1–100 pounds of active ingredient per acre. Normally, the compounds are prepared for aqueous spraying by dissolving in a suitable solvent such as acetone and diluting with water to the desired concentration, say 1,000 parts per million active ingredient. Desirably, the treated soil is covered with a plastic sheet or other suitable material which will completely enclose the soil in which the pests exist and prevent undue loss of the toxicant from the soil. Moreover, the instant toxicant may be used effectively against other soil pests, including termites and plant pathogenic fungi.

DESCRIPTION OF THE PREFERRED EMBODIMENT

In order to demonstrate the invention, the following examples are given. They are provided for illustrative purposes and are not to be construed as limiting the scope of the invention, which is defined by the appended claims.

EXAMPLE 1

Fumigant Activity Tests

Fumigant tests were run against several important common pests: black carpet beetle larvae, furniture carpet beetle larvae, yellow mealworm larvae and yellow mealworm adult. All tests were run under substantially identical conditions. In carrying out these tests, tins having perforated lids and containing the insects and small amounts of appropriate food are placed in a gallon mason jar. The toxicant composition is pipetted onto absorbent cellulose placed in the jar in quantity to give the desired concentration of vapor in the jar. The jar is then sealed. After about a 24-hour exposure, the insect containers are removed and mortality counts are made 1 day later. The results of these tests are set forth in Table I.

TABLE I

| Compound | Dose (lb/1000 cu. ft.) | Percent Mortality | | | |
|---|---|---|---|---|---|
| | | BCBL | FCBL | YML | YMA |
| Perfluoro-1,1,2-trimethyl-1-propanol | 1 | 100 | 100 | 100 | 100 |
| Control | 0 | 0 | 0 | 0 | 0 |

BCBL - Black Carpet Beetle Larvae
FCBL - Furniture Carpet Beetle Larvae
YML - Yellow Mealworm Larvae
YMA - Yellow Mealworm Adult

EXAMPLE 2

Fumigant Activity Study

In a second series of tests carried out as described in Example 1 except using smaller amounts of toxicant, the results set forth in Table II were obtained.

TABLE II

| Compound | Dose (lb/1000 cu. ft.) | Percent Mortality | | | |
|---|---|---|---|---|---|
| | | BCBL | FCBL | YML | YMA |
| Perfluoro-1,1,2-trimethyl-1-propanol | 0.50 | 100 | 100 | 100 | 100 |
| do. | 0.25 | 100 | 100 | 100 | 100 |
| do. | 0.125 | 100 | 100 | 100 | 100 |
| do. | 0.063 | 80 | 100 | 100 | 100 |
| Control | 0 | 0 | 0 | 0 | 0 |

EXAMPLE 3

Grain Penetration Study

In another series of tests, the toxicant was employed in dosage of 0.25–1 pound per 1,000 cubic feet and the insects were placed under 1 inch of grain. The results of these tests are set forth in Table III.

TABLE III

| Compound | Dose (lb/1000 cu. ft.) | % Mortality Under 1 Inch of Grain | | | |
|---|---|---|---|---|---|
| | | BCBL | FCBL | YML | YMA |
| Perfluoro-1,1,2-trimethyl-1-propanol | 1 | 100 | 100 | 100 | 100 |
| do. | 0.5 | 80 | 100 | 100 | 100 |
| do. | 0.25 | 40 | 80 | 80 | 100 |

EXAMPLE 4

Grain Penetration Study

In another series of tests, the toxicant was employed in dosage of 0.25–1 pound per 1,000 cubic feet and the insects were placed under 5 inches of grain. The results of these tests are set forth in Table IV.

TABLE IV

| Compound | Dose (lb/1000 cu. ft.) | % Mortality Under 5 Inches of Grain | | | |
|---|---|---|---|---|---|
| | | BCBL | FCBL | YML | YMA |
| Perfluoro-1,1,2-trimethyl-1-propanol | 1 | 100 | 80 | 100 | 100 |
| do. | 0.5 | 80 | 100 | 100 | 100 |
| do. | 0.25 | 0 | 20 | 0 | 100 |

EXAMPLE 5

Soil Penetration Against Termites

In still another series of tests, the toxicant was employed in dosage of 0.25–1 pound per 1,000 cubic feet against termites under 1–5 inches of soil. The results of these tests are set forth in Table V.

TABLE V

| Compound | Dose (lb/1000 cu. ft.) | % Mortality of Termites | |
|---|---|---|---|
| | | Under 1" Soil | Under 5" Soil |
| Perfluoro-1,1,2-trimethyl-1-propanol | 1 | 100 | 100 |
| do. | 0.5 | 100 | 30 |
| do. | 0.25 | 100 | 0 |

EXAMPLE 6

The compounds of the invention also showed significant nematocidal activity. The test is conducted as follows:

*Meloidogyne Incognita*, Proctectant, Soil Treatment

Sufficient nematode-infested soil to effect twice the desired nematode concentration is added on a dry weight basis to sterile soil, placed in a sealed soil blender and blended therein.

Candidate compound dissolved in acetone is added at concentrations to effect 12–50 pounds per acre, twice the desired chemical concentration, to a unit of sterilized soil in a sealed soil blender and blended therein. Chemically treated soil is then added to an equivalent unit of nematode-infested soil, placed in the soil blender and blended therein.

Bonny Best tomato plants approximately three to four weeks old with root development adequate to hold the soil ball intact are removed undisturbed and completely embedded in four inch pots of nematode infested chemically treated soil.

Controls include sterile soil, sterile soil plus chemical, and sterile soil plus nematodes.

Control effectiveness of the candidate compound is determined by actual count of knots appearing in the root system in chemically treated soil compared to equivalent counts on root systems in nematode-infested soil. All units of test include a minimum of three replicates.

According to this test, the perfluoro-1,1,2-trimethyl-1-propanol composition showed 65% control of *Meloidogyne incognita* at a soil application rate of 25 pounds of active ingredient per acre, 67% control at 12 pounds per acre, and 65% control at 6 pounds per acre. There was no evidence of phytotoxicity on the tomato plants at these concentrations.

EXAMPLE 7

Fumigant Activity Tests

Fumigant tests were carried out to compare activity of two fumigants of the present invention, i.e., perfluoro-1,1,2-trimethyl-1-propanol and perfluoro-1,1,-dimethyl-1-propanol. The comparative tests were run against black carpet beetle larvae (BCBL), furniture carpet beetle larvae (FCBL), yellow mealworm adult (YMA), yellow mealworm larvae (YML), and confused flour beetle larvae (CFBL). The test procedure of Example 1 was followed, and results of the tests are set forth in Table VI.

TABLE VI

| Compound | Dose (lb/1000 cu. ft.) | BCBL | FCBL | YMA | YML | CFBL |
|---|---|---|---|---|---|---|
| Perfluoro-1,1,2-trimethyl-1-propanol | 0.250 | 100 | 100 | 100 | 100 | 100 |
| do. | 0.125 | 100 | 100 | 100 | 100 | 100 |
| do. | 0.063 | 100 | 80 | 100 | 80 | 100 |
| Perfluoro-1,1-dimethyl-1-propanol | 0.250 | 100 | 100 | 100 | 100 | 100 |
| do. | 0.125 | 100 | 100 | 100 | 100 | 100 |
| do. | 0.063 | 100 | 100 | 100 | 100 | 100 |
| Control | 0 | 0 | 0 | 0 | 0 | 0 |

In additional tests, similar pesticidal activity was noted against other insect species and at shorter exposure times of 6 and 12 hours. Also, seed germination studies showed no phytotoxicity at normal fumigant application rates.

We claim:

1. A process for controlling insect organisms infesting an enclosed space which comprises contacting said insect organisms with an insecticidally effective concentration of a compound of the formula

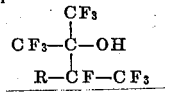

wherein R is selected from the group consisting of fluorine and trifluoromethyl, said compound being employed in a concentration of about 0.063 pounds per thousand cubic feet of enclosed space.

2. The process of claim 1 wherein R is fluorine.

3. The process of claim 1 wherein R is trifluoromethyl.

* * * * *